United States Patent
Kwon et al.

(10) Patent No.: US 8,381,085 B2
(45) Date of Patent: Feb. 19, 2013

(54) SEMICONDUCTOR MEMORY DEVICE AND DATA PROCESSING METHOD THEREOF

(75) Inventors: EuiJin Kwon, Seoul (KR); Kyoungmook Lim, Suwon-si (KR); Kwanho Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 12/875,479

(22) Filed: Sep. 3, 2010

(65) Prior Publication Data

US 2011/0060965 A1  Mar. 10, 2011

(30) Foreign Application Priority Data

Sep. 4, 2009  (KR) .................. 10-2009-0083630

(51) Int. Cl.
*H03M 13/00* (2006.01)
(52) U.S. Cl. .................. 714/801; 714/763; 714/782
(58) Field of Classification Search .................. 714/763, 714/782, 801
See application file for complete search history.

(56) References Cited

U.S. PATENT DOCUMENTS

| 7,437,653 B2* | 10/2008 | Gorobets .................. 714/782 |
| 8,145,977 B2* | 3/2012 | Lee .................. 714/763 |
| 2004/0255225 A1 | 12/2004 | Takai |
| 2009/0225695 A1* | 9/2009 | Kang et al. .................. 370/315 |

FOREIGN PATENT DOCUMENTS

| JP | 2004-234545 A | 8/2004 |
| JP | 2006-127441 A | 5/2006 |
| JP | 2008-525937 A | 7/2006 |
| KR | 10-2007-0099586 A | 10/2007 |
| WO | 2006/069235 A1 | 6/2006 |

* cited by examiner

*Primary Examiner* — Sam Rizk
(74) *Attorney, Agent, or Firm* — Sughrue Mion, PLLC (57) ABSTRACT

A semiconductor memory device is provided. The semiconductor memory device includes an error correction code block and a memory. The error correction code block performs error correction encoding for user data to generate parity data. The memory stores the user data and the parity data. The error correction code block generates parity data, including a number of bits equal to at least 2t, wherein t is a natural number, and the bits of the parity data distinguish free page data from user data that is equal to the free page data.

18 Claims, 9 Drawing Sheets

SEMICONDUCTOR MEMORY DEVICE AND DATA PROCESSING METHOD THEREOF

STATEMENT OF RELATED APPLICATION

This U.S. non-provisional patent application claims priority from Korean Patent Application No. 10-2009-0083630, filed on Sep. 4, 2009, the entire contents of which are hereby incorporated by reference.

SUMMARY

Methods and apparatuses consistent with the exemplary embodiments relate to a semiconductor memory device and a data processing method thereof, which process user data to be stored in a memory.

In a typical semiconductor memory device, an error may occur when writing/reading data to/from a memory. The semiconductor memory device uses an Error Correction Code (ECC) block for correcting the error.

Generally, an error may occur in user data when writing/reading the user data to/from a memory. For detecting and correcting the error, an ECC block is used. The ECC block stores the user data and parity data of the user data together when writing the user data. The parity data is generated through the error correction encoding operation of the ECC block and is used for detecting and correcting an error. When reading the user data, the ECC block reads the parity data and the user data together, thereby detecting and correcting an error.

Accordingly, the ECC block can detect and correct an error that exists within an allowed range.

Free page data, which are erased for writing data in a memory and are not used, exist in a memory device. As an example, the free page data are identically configured with one bit (for example, a bit '1'). That is, all the free page data may be configured with a bit '1'.

The ECC block detects free page data when reading data. When the free page data are detected, the ECC block does not perform an error detecting and correcting operation for the free page data. However, the user data and the free page data may be configured with the same bit, for example, a bit '1'. At this point, when all the user data are configured with the bit '1', all the parity data of the user data are configured with the bit '1'. That is, all the user data and the parity data that are stored in a memory are configured with the bit '1'.

In this way, the user data are configured with the same bits as those of the free page data up to the parity data. Accordingly, the ECC block regards the user data, which are configured with the same bits as those of the free page data, as the free page data. At this point, the ECC block does not perform an error correcting and encoding operation for the user data that are regarded as the free page data.

According to an aspect of one or more exemplary embodiments, there is provided a semiconductor memory device, which divides user data and free page data.

According to another aspect of one or more exemplary embodiments, there is provided a semiconductor memory device, which divides free page data and user data having the same value as that of the free page data.

One or more exemplary embodiments provide a semiconductor memory device including: an error correction code block performing error correction encoding for user data to generate parity data; and a memory storing the user data and the parity data, wherein the error correction code block generates parity data, including at least 2t (where t is a natural number) number of bits for dividing the free page data that is the same as the user data.

The error correction code block may add an indicator for dividing with the free page data to padding data of the user data to generate the parity data.

The indicator may be configured with at least one bit which differs from a bit configuring the free page data.

In one or more exemplary embodiments, t may be the maximum number of errors correctable by the error correction code block.

The error correction code block may include: a first inverter inverting the user data; a padding data adder padding the padding data to which the indicator is added in the inverted user data, when the user data is the same as the free page data; a parity bit generator generating a parity bit with the inverted user data and the padding data; and a second inverter inverting the inverted user data and the parity bit to store the inverted data and bit in the memory.

According to an aspect of one or more exemplary embodiments, there is provided a data writing method of a semiconductor memory device that includes: performing error correction encoding for user data to generate parity data; and storing the user data and the parity data, wherein the generating of parity data generates the parity data including at least 2t (where t is a natural number) number of bits for dividing with the free page data, when the user data is the same as the free page data.

The generating of the parity data may include: adding an indicator, which is configured with a bit different from a bit of the free page data, to padding data of the user data when the user data is the same as the free page data; and generating the parity data including at least 2t (where t is a natural number) number of bits for dividing with the free page data by using the user data and the padding data including the indicator.

The indicator may be configured with at least one bit which differs from a bit configuring the free page data.

In one or more exemplary embodiments, t may be the maximum number of errors correctable by the error correction code block.

BRIEF DESCRIPTION OF THE DRAWINGS

The accompanying drawings are included to provide a further understanding of the exemplary embodiments, and are incorporated in and constitute a part of this specification. In the drawings.

DETAILED DESCRIPTION OF THE EXEMPLARY EMBODIMENTS

Exemplary embodiments will be described below in more detail with reference to the accompanying drawings. The inventive concept may, however, be embodied in different forms and should not be construed as limited to the exemplary embodiments set forth herein. Rather, these exemplary embodiments are provided so that this disclosure will be thorough and complete. Also, in the following description, only elements necessary for understanding operations according to exemplary embodiments will be described, and the description of other elements will be omitted in order not to unnecessarily obscure subject matters of the inventive concept.

Figure 1:
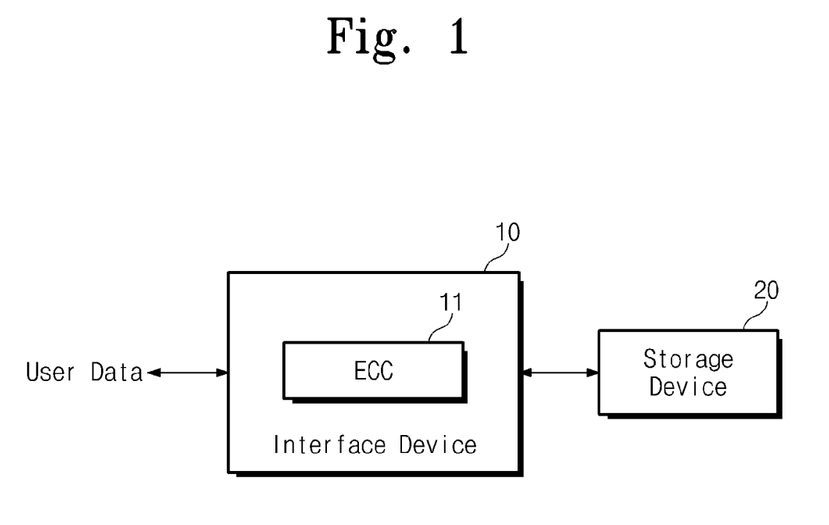
FIG. 1 is a diagram illustrating the structure of a semiconductor memory device according to an exemplary embodiment.

Referring to FIG. 1, a semiconductor memory device according to an exemplary embodiment includes an interface device 10 and a storage device 20.

The semiconductor memory device divides user data that is configured with the same bit as that of free page data in the storage device 20.

The storage device 20 stores the user data. The storage device 20 stores data, i.e., the free page data, which is erased when writing data to the storage device 20. Herein, the free page data refers to data that are configured with only one bit (for example, 1).

The interface device 10 interfaces the exchange of the user data with the storage device 20. That is, the interface device 10 writes the user data to the storage device 20 or reads the user data that is stored in the storage device 20.

The interface device 10 includes an ECC block 11 for correcting errors in the user data.

The ECC block 11 uses an indicator for distinguishing the user data from the free page data stored in the storage device 20. Herein, the indicator includes a bit (for example, a bit '0') that differs from a bit (for example, a bit '1') used to configure the free page data.

The ECC block 11 adds the indicator to padding data, which is added to the user data when encoding an error correction code. Herein, the padding data is added to the user data to form a codeword of a predetermined length.

The ECC block 11 generates parity data using the user data and the padding data to which the indicator is added. At this point, the generated parity data includes a bit used to configure the free page data and a total number of bits equal to 2t, wherein t is the maximum number (for example, the total number of errors that are allowed for detecting and correcting an error) of errors correctable by the ECC block 11, and t is a natural number. The parity data is written together with the user data to the storage device 20. Moreover, the parity data is read together with the user data during decoding.

The ECC block 11 may divide the user data and the free page data with the parity data (including a bit used to configure the free page data and the 2t bits) that is read together with the user data during decoding.

The ECC block 11 may be implemented in hardware or software.

Figure 2:
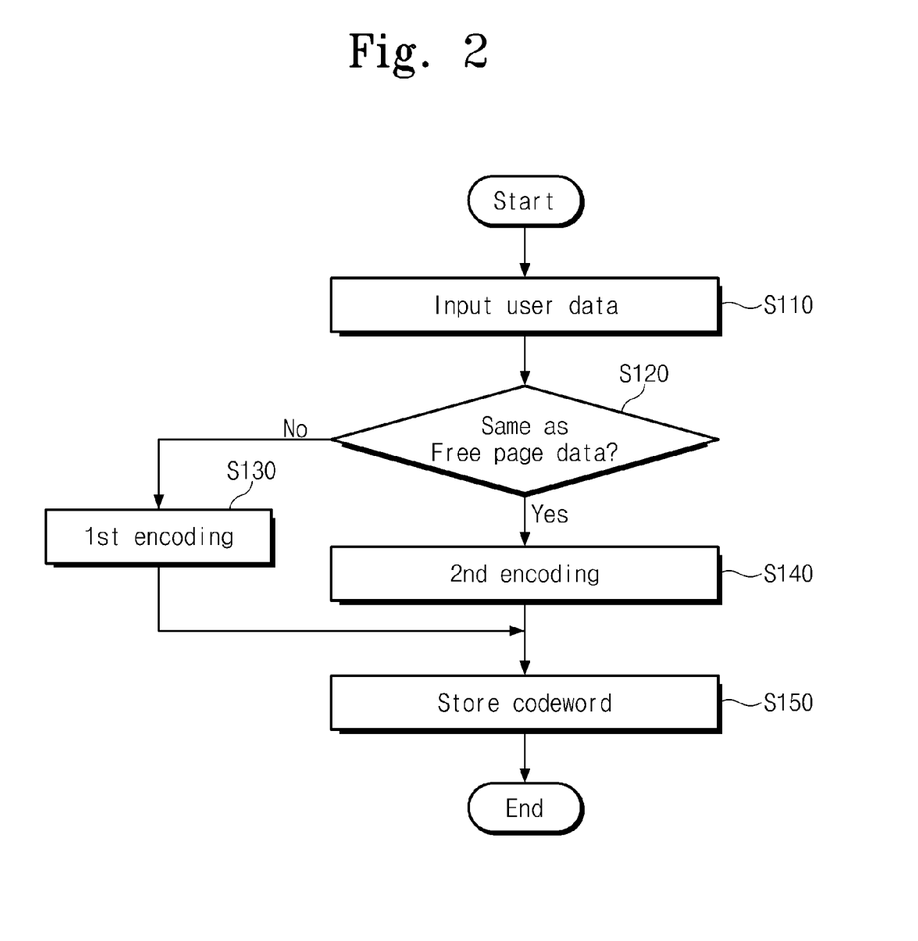
FIG. 2 is a flow chart illustrating the encoding operation of an ECC block in FIG. 1.

FIG. 2 is a flow chart illustrating the encoding operation of the ECC block 11 in FIG. 1.

Referring to FIG. 2, the ECC block 11 receives the user data in operation S110.

The ECC block 11 determines whether the received user data is the same as the free page data in operation S120.

If the received user data differs from the free page data in operation S120, the ECC block 11 proceeds to operation S130. The ECC block 11 performs a first encoding operation in operation S130. The first encoding operation is the same as the error correction encoding operation of the user data that is performed in the existing ECC block.

On the other hand, if the received user data is determined to be the same as the free page data in operation S120, the ECC block 11 proceeds to operation S140. The ECC block 11 performs a second encoding operation in operation S140, in which the ECC block 11 adds the indicator to the padding data to generate the parity data of the user data. For this, the ECC block 11 adds the indicator to at least one portion of the padding data that is added to the user data.

The ECC block 11 stores a codeword, which is generated through the first encoding operation or the second encoding operation, in the storage device 20 in operation S150. Herein, the codeword includes the user data and the parity data.

Figure 3:
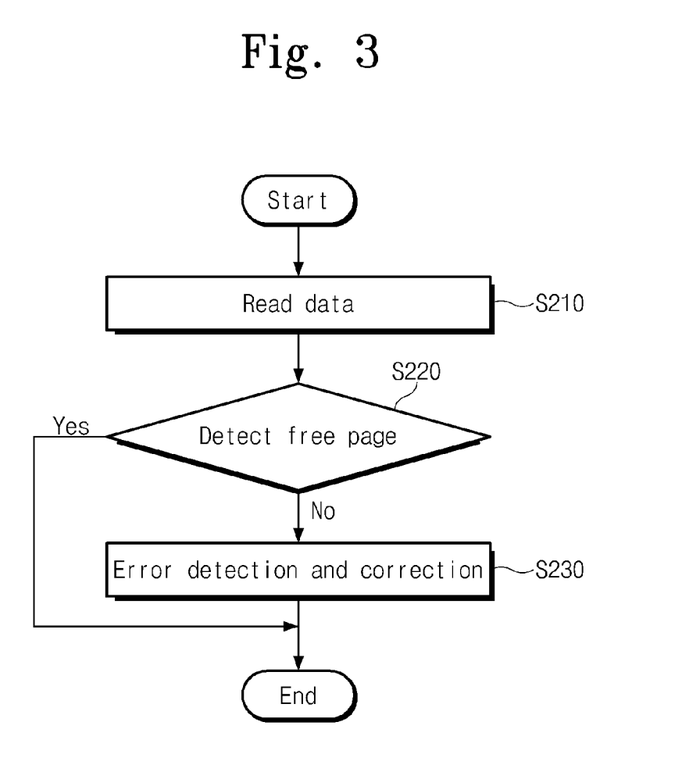
FIG. 3 is a flow chart illustrating the decoding operation of the ECC block in FIG. 1.

FIG. 3 is a flow chart illustrating the decoding operation of the ECC block 11 in FIG. 1.

Referring to FIG. 3, the ECC block 11 reads data from the storage device 20 in operation S210.

The ECC block 11 determines whether the read data is the free page data in operation S220.

If the read data is determined to be the free page data in operation S220, the ECC block 11 ends a decoding operation without performing an error detecting and correcting operation.

If the read data is not determined to be the free page data in operation S220, the ECC block 11 proceeds to operation S230. Herein, the data read by the ECC block 11 is a codeword including the user data and the parity data.

In operation S230, the ECC block 11 detects and corrects errors in the user data by using the parity data that is read together with the user data.

Figure 4:
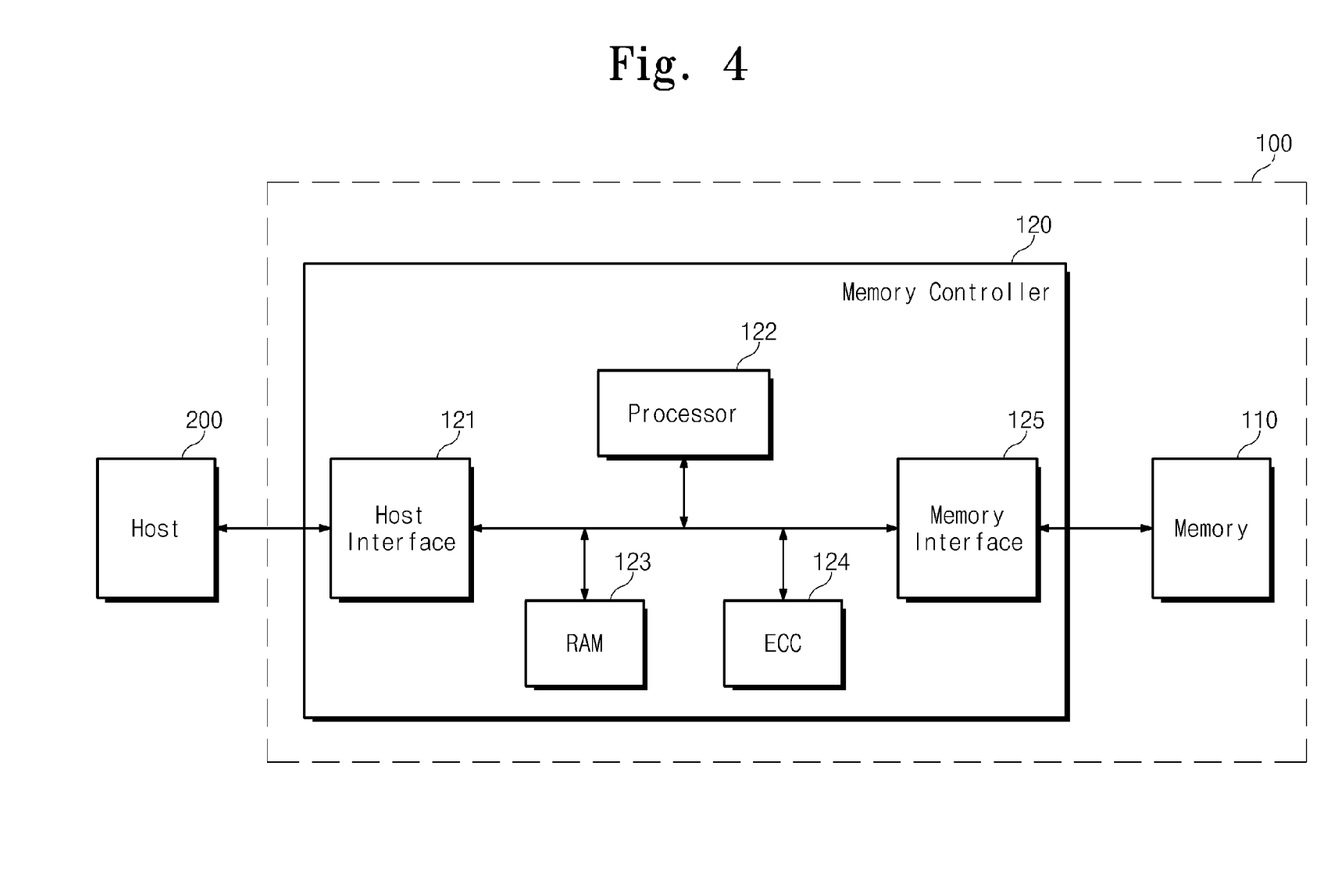
FIG. 4 is a diagram illustrating a semiconductor memory system including a semiconductor memory device according to an exemplary embodiment.

FIG. 4 is a diagram illustrating a semiconductor memory system including a semiconductor memory device according to an exemplary embodiment.

Referring to FIG. 4, a semiconductor memory system includes a semiconductor memory device 100 and a host 200.

The semiconductor memory device 100 includes a memory 110 for storing data, and a memory controller 120 for controlling the memory 110.

The memory controller 120 includes a host interface 121, a processor 122, a Random Access Memory (RAM) 123, an ECC block 124, and a memory interface 125.

The host interface 121 interfaces with the host 200 to exchange data. The RAM 123 temporarily stores user data that will be stored in the memory 110. The RAM 123 is used as the working memory of the processor 122. The ECC block 124 is used to analyze or correct bit errors in data stored in the memory 110. The memory interface 125 is connected to the memory 200, and interfaces with the memory 200 to exchange a command, an address, data and a control signal.

The processor 122 performs an overall operation for data exchange.

In this exemplary embodiment, the ECC block 124 divides free page data and user data that is the same as the free page data.

The ECC block 124 performs an error correction code encoding operation when writing the user data, and performs an error correction code decoding operation when reading the user data.

The ECC block 124 generates parity data corresponding to the user data in error correction encoding. The ECC block 124 generates parity data by using the user data that is the same as the free page data, and the parity data has the same value as that of the free page data. Accordingly, the ECC block 124 adds an indicator to the padding data for dividing the free page data. That is, the ECC block 124 changes at least one of the bits of the padding data into the indicator. Herein, the padding data includes the indicator.

The ECC block 124 generates the parity data, which is not configured with only the bits of the free page data, through error correction code encoding. The ECC block 124 stores the user data and the parity data together in the memory 110.

In a user data reading operation, the ECC block 124 does not perform the error correction code decoding operation of the free page data. The ECC block 124 generates the parity data in order not to be the same as the free page data, and thus can divide the free page data and the user data that is the same as the free page data using the parity data.

As an example, an error correction code according to an exemplary embodiment may use block codes such as Bose-Chaudhuri-Hoquenbhem (BCH) code and Reed Solomon (RS) code.

Figure 5:
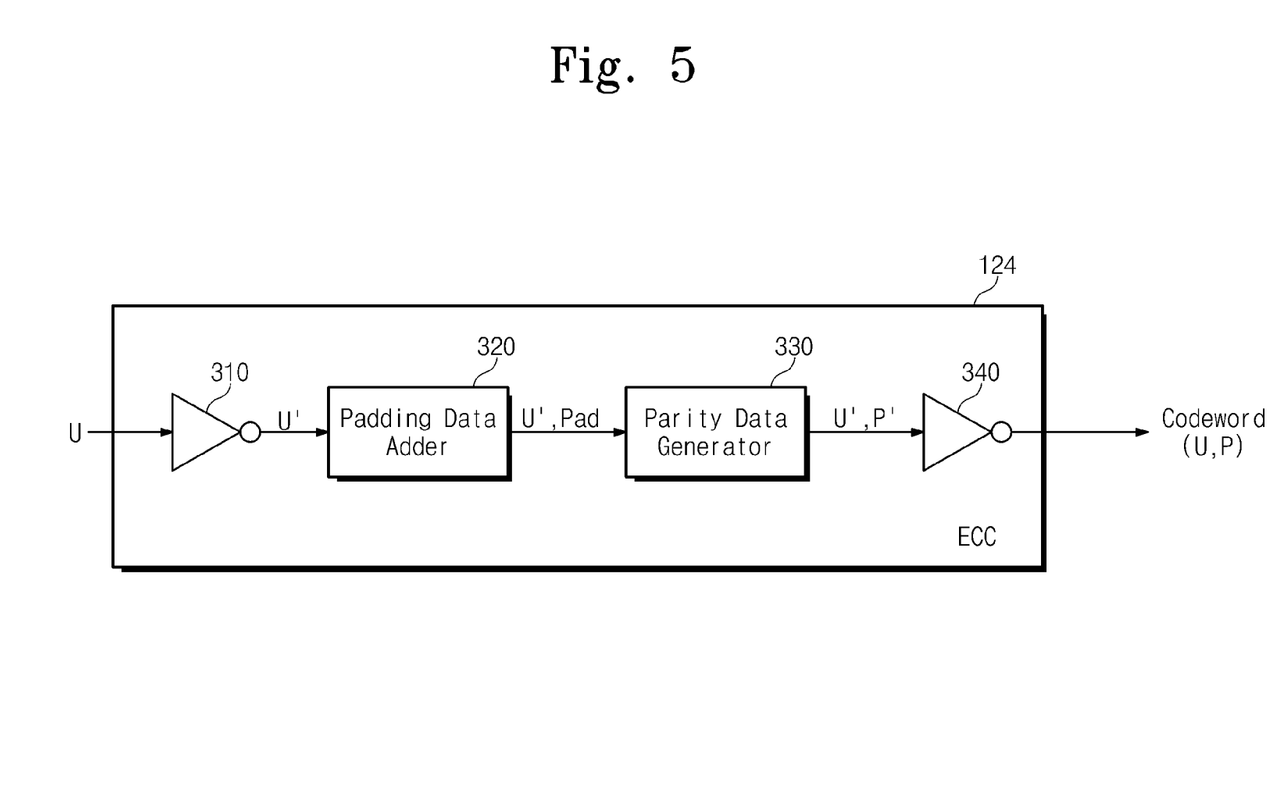
FIG. 5 is a diagram illustrating the detailed structure of an ECC block in FIG. 4.

FIG. 5 is a diagram illustrating the detailed structure of the ECC block 124 in FIG. 4.

Referring to FIG. 5, the ECC block 124 includes a first inverter 310, a padding data adder 320, a parity data generator 330, and a second inverter 340.

The first inverter 310 inverts user data U inputted. As an example, the first inverter 310 inverts a bit '1' included in the user data into a bit '0', or inverts a bit '0' included in the user data into a bit '1'.

The padding data adder 320 adds (i.e., pads) padding data Pad to the inverted user data U'. At this point, when the inverted user data U' is the same as the free page data, the padding data adder 320 changes a portion of the padding data Pad into an indicator and pads it to the inverted user data U'. When the inverted user data U' is not the same as the free page data, the padding data adder 320 pads the padding data Pad in the inverted user data U'.

The parity data generator 330 generates the parity data P' by using the inverted user data U' and the padding data Pad. The parity data of the user data that is the same as the free page data includes at least 2t bits that differ from bits used to configure the free page data, where t is the maximum number (for example, the total number of errors that are allowed for detecting and correcting an error) of errors correctable by the ECC block 11, and t is a natural number.

The second inverter 340 inverts the inverted user data U' and the parity data P' to output the user data and parity data. The operation of the second inverter 340 is similar to that of the first inverter 310. The user data U that is outputted by the second inverter 340 and the inverted parity data P are included in a codeword that is stored in the memory 110.

Figure 6:
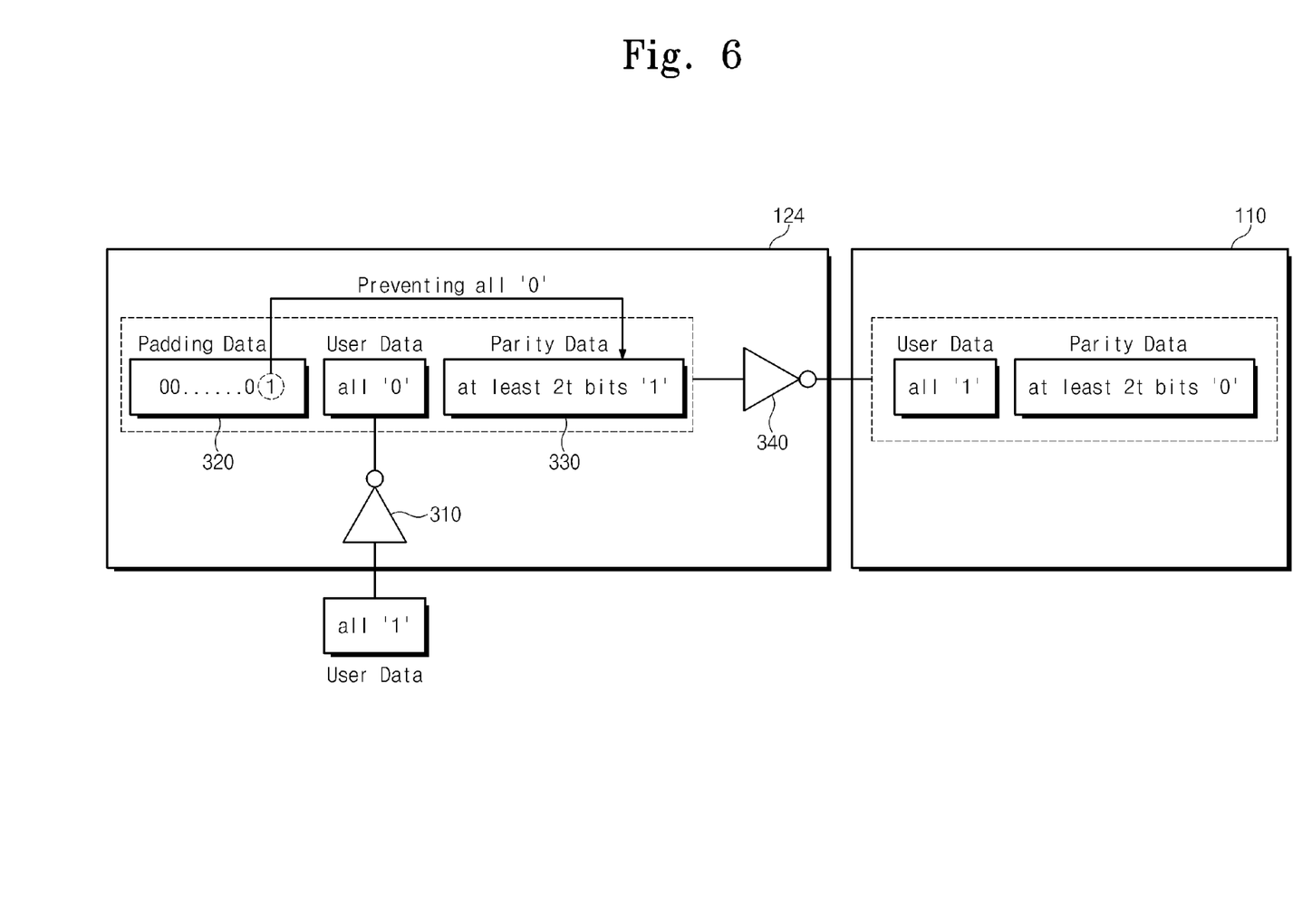
FIG. 6 is a diagram illustrating data in accordance with the error correction code encoding operation of FIG. 5.

FIG. 6 is a diagram illustrating data in accordance with the error correction code encoding operation of FIG. 5.

Referring to FIG. 6, the ECC block 124 receives user data that are configured with a bit '1'. As an example, it is assumed that all the free page data are configured with a bit '1'.

The first inverter 310 inverts the user data U configured with a bit '1' to generate the inverted user data U' that are configured with a bit '0'.

The padding data adder 320 pads the padding data Pad of a bit '0'. Herein, all the input user data U are configured with a bit '1', and have the same format as that of the free page data (which is configured with a bit '1'). At this point, the padding data adder 320 adds an indicator of a bit '1' to the padding data Pad. The indicator allows all the bits of the parity data not to become '0'. The indicator may be configured with two or more '1'. However, as the number of indicators (i.e., the number of bits) increases, error detecting and correcting performance decreases.

The parity data generator 330 generates the parity data P'. When the indicator is included in the padding data Pad, the parity data generator 330 generates the parity data P' including at least 2t number of bits that are configured as '1'.

The second inverter 340 inverts the inverted user data U' (which are configured with a bit '0') and the parity data P' (including at least 2t number of bits that are configured as '1') and stores the user data U and the inverted parity data P in the memory 110.

The memory 110 stores the user data that are configured with a bit '1' and the parity data including at least 2t bits that are configured as '0'. When the memory controller 120 (or the ECC block 11) reads the memory 110, the user data may be divided from the free page data by the parity data, which has a value different from that of the free page data.

Figure 7:
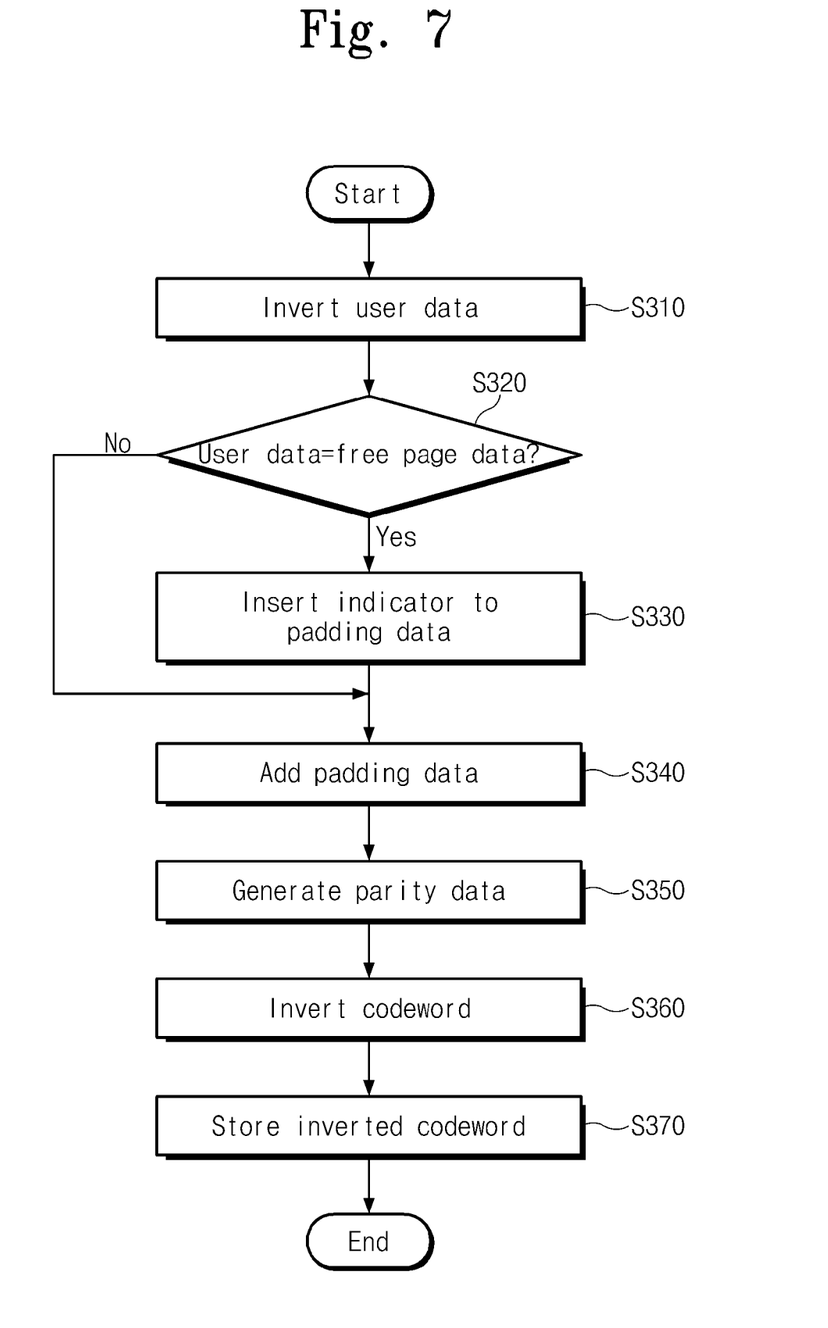
FIG. 7 is a flow chart illustrating the operation of the ECC block which is exemplarily illustrated in FIG. 5.

FIG. 7 is a flow chart illustrating the operation of the ECC block which is exemplarily illustrated in FIG. 5.

Referring to FIG. 7, in operation S310, the first inverter 310 inverts the inputted user data U.

The padding data adder 320 determines whether the inverted user data U' is the same as the free page data in operation S320.

If the inverted user data U' is determined to be the same as the free page data in operation S320, the padding data adder 320 proceeds to operation S330.

In operation S330, the padding data adder 320 adds the indicator to the padding data Pad, and proceeds to operation S340.

If the inverted user data U' is not determined to be the same as the free page data in operation S320, the padding data adder 320 proceeds to operation S340.

In operation S340, the padding data adder 320 adds the padding data Pad to the inverted user data U'. If the user data U differs from the free page data, the padding data adder 320 adds padding data, which does not include the indicator, to the inverted user data U'. If the user data U is the same as the free page data, the padding data adder 320 adds the padding data Pad, including the indicator, to the inverted user data U'.

In operation S359, the parity data generator 330 generates the parity data P' by using the user data "U', Pad" to which the padding data Pad is added. The inverted user data U' and the parity data P' are collectively referred to as a codeword.

In operation S360, the second inverter 340 inverts the codeword, which includes the inverted user data U' and the parity data P'.

In operation S370, the second inverter 340 stores the inverted codeword, i.e., the user data U and the inverted parity data P in the memory 110. Herein, the codeword, which includes the user data and the inverted parity data may be divided from the free page data.

Figure 8:
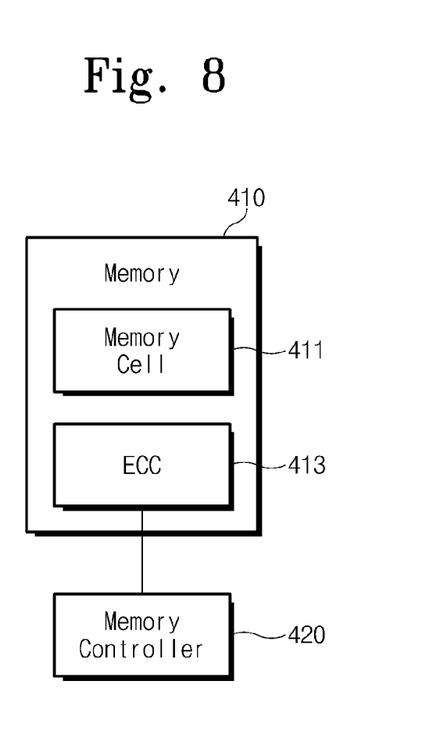
FIG. 8 is a diagram illustrating the structure of a memory system according to another exemplary embodiment.

FIG. 8 is a diagram illustrating the structure of a memory system according to an exemplary embodiment.

Referring to FIG. 8, the memory system according to an exemplary embodiment includes a memory 410 and a memory controller 420. The memory 410 may include a memory cell 411 and an ECC block 413. The memory cell 411 is arranged in regions where a plurality of rows (i.e., word lines) and a plurality of columns (i.e., bit lines) are perpendicularly crossed.

The ECC block 413 of the memory 410 may be implemented in software or hardware. In this case, the ECC block 413 performs an operation for dividing the user data and the free page data.

The ECC block 413 adds an indicator to padding data according to the control of the memory controller 420, and thus generates the parity data for user data that is the same as the free page data, wherein the parity data differs from the free page data.

In the above-described exemplary embodiment, the ECC block adds the indicator, having a bit value different from that of the free page data, to the padding data. However, the ECC block adds the indicator to at least a portion of the user data, and thus can prevent the user data and the parity data from being always configured with only the bit of the free page data. Herein, the ECC block may include an indicator adder adding the indicator to the user data.

The indicator is added to divide the free page data, and corresponds to an error in error correction decoding. For example, the indicator may be configured with one bit. In this case, the total number of errors that are allowed for error detection and correction in the ECC block decreases to a t−1 number (for example, when the indicator is configured with 2 bits, the total number of errors decreases to a t−2 number). Therefore, as the number of bits of the indicator decreases, the error correction performance of the ECC block increases.

Figure 9:
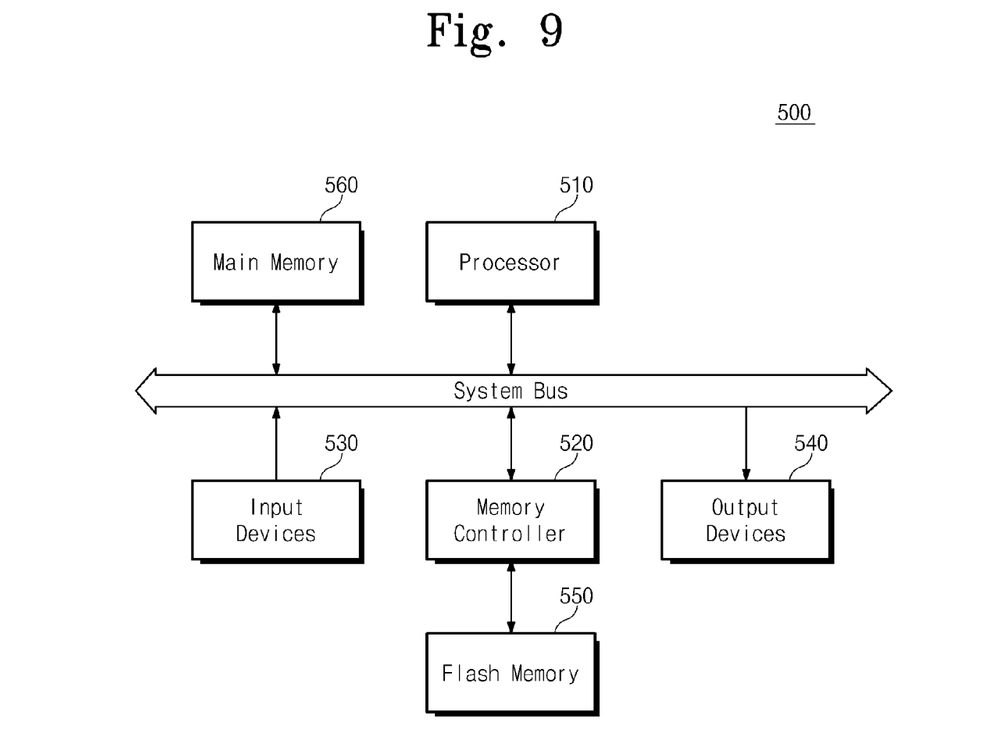
FIG. 9 is a diagram illustrating a computing system including a semiconductor memory device according to an exemplary embodiment.

FIG. 9 is a diagram illustrating a computing system including a semiconductor memory device according to an exemplary embodiment.

Referring to FIG. 9, a computing system 500 according to an exemplary embodiment includes a processor 510, a memory controller 520, input devices 530, output devices 540, a flash memory 550, and a main memory 560. Herein, the flash memory 550 is the semiconductor memory device according to exemplary embodiments. In FIG. 9, a solid line indicates a system bus through which data or a command is transmitted.

The memory controller 520 and the flash memory 550 may configure a memory card. The processor 510, the input devices 530, the output devices 540 and the main memory 560 may configure a host using a memory card as a storage.

The computing system 500 receives external data through the input devices 530 (for example, a keyboard and a camera). The received data may be a command from a user and multimedia data, which is inputted through a camera, such as image data. The received data is stored in the flash memory 550 or the main memory 560.

The processing result of the processor 510 is stored in the flash memory 550 or the main memory 560. The output devices 540 output data that is stored in the flash memory 550 or the main memory 560. The output devices 540 output digital data in a format that may be sensed by a person. For example, the output devices 540 include a display or a speaker.

The memory controller 520 or the flash memory 550 may include an ECC block for dividing user data and free page data according to an exemplary embodiment. The ECC block generates the parity data of the user data, which is written in the flash memory 550, in order to have a bit value different from that of the fee page data, thereby dividing user data that is the same as the free page data.

The flash memory 550 and/or the memory controller 520 may be mounted with various types of packages. For example, the flash memory 550 and/or the memory controller 520 may be mounted with packages such as Package on Package (PoP), Ball Grid Arrays (BGAs), Chip Scale Packages (CSPs), Plastic Leaded Chip Carrier (PLCC), Plastic Dual In-Line Package (PDIP), Die In Waffle Pack (DIWP), Die In Wafer Form (DIWF), Chip On Board (COB), Ceramic Dual In-Line Package (CERDIP), Plastic Metric Quad Flat Pack (MQFP), Thin Quad Flat Pack (TQFP), Small Outline Package (SOP), Shrink Small Outline Package (SSOP), Thin Small Outline Package (TSOP), Thin Quad Flat Pack (TQFP), System In Package (SIP), Multi Chip Package (MCP), Wafer Level Stack Package (WLSP), Die In Wafer Form (DIWF), Die On Waffle Package (DOWP), Wafer-level Fabricated Package (WFP) and Wafer-Level Processed Stack Package (WSP).

Although not shown, it is apparent to those skilled in the art that a power supply is required for supplying a power source necessary for the operation of the computing system 500. If the computing system 500 is a portable device, a battery may be additionally required for supplying the operation power source of the computing system 500.

In FIG. 9, the semiconductor memory device according to the exemplary embodiments being applied to the computing system has been exemplarily described above, but the semiconductor memory device according to the exemplary embodiments may be applied to various devices other than a portable terminal. For example, the semiconductor memory device according to the exemplary embodiments may be applied to a Solid State Drive (SSD). Moreover, the semiconductor memory device according to exemplary embodiments may be used as a portable memory. Accordingly, the semiconductor memory device according to the exemplary embodiments may be used as storage for devices such as MP3 players, digital cameras, Personal Digital Assistants (PDA), e-Book and USB memories. Furthermore, the semiconductor memory device according to the exemplary embodiments may be used as storage for digital TVs or computers.

For example, it is assumed that the semiconductor memory device according to the exemplary embodiments is a USB memory connected to the computing system. In this case, an input device and an output device are configured with USB ports that may be connected to the USB memory. The USB memory outputs data to the computing system or receives data from the computing system, according to the control of the computing system.

According to the exemplary embodiments, the semiconductor memory device adds the indicator to the padding data of the user data to generate the parity data, and thus divides the free page data from the user data having the same value as that of the free page data.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A semiconductor memory device, comprising:
   an error correction code unit that performs error correction encoding for user data, and generates parity data; and
   a memory unit that stores the user data and the parity data, wherein the error correction code unit generates the parity data, which comprises a number of bits equal to at least 2t, wherein t is a natural number, and the bits of the parity data distinguish free page data from user data that is equal to the free page data.

2. The semiconductor memory device of claim 1, wherein the error correction code unit generates the parity data by adding an indicator to padding data of the user data, wherein the indicator distinguishes the free page data from user data that is equal to the free page data.

3. The semiconductor memory device of claim 2, wherein the indicator comprises at least one bit which differs from a bit of the free page data.

4. The semiconductor memory device of claim 1, wherein t is the maximum number of errors correctable by the error correction code unit.

5. The semiconductor memory device of claim 1, wherein the error correction code unit comprises:
   a first inverter that inverts the user data;
   a padding data adder that, if the user data is equal to the free page data, adds padding data to the inverted user data;
   a parity bit generator that generates a parity bit using the inverted user data and the padding data; and
   a second inverter that inverts the inverted user data and the parity bit and stores the user data and inverted parity bit in the memory unit.

6. The semiconductor memory device of claim 5, wherein if the user data is equal to the free page data, the padding data adder adds an indicator to the padding data that distinguishes the free page data from the user data that is equal to the free page data.

7. A data writing method of a semiconductor memory device, the data writing method comprising:
   performing error correction encoding for user data, and generating parity data; and
   storing the user data and the parity data,
   wherein the parity data comprises a number of bits equal to at least 2t, wherein t is a natural number, and the bits of the parity data distinguish free page data from user data that is equal to the free page data.

8. The data writing method of claim 7, wherein the generating of parity data comprises:
   if the user data is equal to the free page data, adding an indicator, which is configured with a bit different from a bit of the free page data, to padding data of the user data; and
   generating the parity data using the user data and the padding data, which includes the indicator.

9. The data writing method of claim 8, wherein the indicator is comprises at least one bit which differs from a bit of the free page data.

10. The data writing method of claim 7, wherein t is the maximum number of errors correctable by the error correction encoding.

11. The data writing method of claim 7, wherein the error correction encoding comprises:
    inverting the user data;
    if the user data is equal to the free page data, adding padding data to the inverted user data;
    generating a parity bit using the inverted user data and the padding data; and
    inverting the inverted user data and the parity bit, and storing the user data and inverted parity bit.

12. The data writing method of claim 11, further comprising, if the user data is equal to the free page data, adding an indicator to the padding data that distinguishes the free page data from the user data that is equal to the free page data.

13. A semiconductor memory system comprising:
    a semiconductor memory device; and
    a host device;
    wherein the semiconductor memory device comprises a memory controller and a memory unit;
    wherein the memory controller comprises an error correction code unit that performs error correction encoding for user data, and generates parity data, which comprises a number of bits equal to at least 2t, wherein t is a natural number, and the bits of the parity data distinguish free page data from user data that is equal to the free page data.

14. The semiconductor memory system of claim 13, the error correction code unit generates the parity data by adding an indicator to padding data of the user data, wherein the indicator distinguishes the free page data from user data that is equal to the free page data.

15. The semiconductor memory system of claim 14, wherein the indicator comprises at least one bit which differs from a bit of the free page data.

16. The semiconductor memory system of claim 13, wherein t is the maximum number of errors correctable by the error correction code unit.

17. The semiconductor memory system of claim 13, wherein the error correction code unit comprises:
    a first inverter that inverts the user data;
    a padding data adder that, if the user data is equal to the free page data, adds padding data to the inverted user data;
    a parity bit generator that generates a parity bit using the inverted user data and the padding data; and
    a second inverter that inverts the inverted user data and the parity bit and stores the user data and inverted parity bit in the memory unit.

18. The semiconductor memory system of claim 17, wherein if the user data is equal to the free page data, the padding data adder adds an indicator to the padding data that distinguishes the free page data from the user data that is equal to the free page data.

* * * * *